United States Patent [19]
Karlsson

[11] Patent Number: 5,613,644
[45] Date of Patent: Mar. 25, 1997

[54] BAIL MECHANISM IN AN OPEN-FACE FISHING REEL OF THE FIXED-SPOOL TYPE

[75] Inventor: Bengt-Åke Karlsson, Karlshamn, Sweden

[73] Assignee: Abu AB, Svängsta, Sweden

[21] Appl. No.: 380,583

[22] Filed: Jan. 30, 1995

[51] Int. Cl.$^6$ .................................................. A01K 89/01
[52] U.S. Cl. .................................................. 242/232
[58] Field of Search .................................. 242/231, 232, 242/233

[56] References Cited

U.S. PATENT DOCUMENTS

| | | | |
|---|---|---|---|
| 3,743,207 | 7/1973 | McMickle | 242/233 |
| 4,147,313 | 4/1979 | Sazaki | 242/232 |
| 4,245,797 | 1/1981 | Tissot | 242/233 |
| 4,389,027 | 6/1983 | Sazaki et al. | 242/233 |
| 4,480,803 | 11/1984 | Sazaki | 242/232 |
| 4,932,616 | 6/1990 | McMickle et al. | 242/233 |
| 4,941,626 | 7/1990 | Carlsson | 242/231 |
| 5,273,233 | 12/1993 | Sugawara | 242/232 |

FOREIGN PATENT DOCUMENTS 0007198  2/1974  Japan ........................................ 242/232

*Primary Examiner*—Daniel P. Stodola
*Assistant Examiner*—William A. Rivera
*Attorney, Agent, or Firm*—Browdy and Neimark

[57] ABSTRACT

A bail mechanism in an open-face fishing reel of the fixed-spool type having a rotor and a line spool which is coaxial with the rotor and oscillates in the axial direction, has a bail for winding a line onto the line spool. By way of two mounting elements, the bail is mounted on two attachments which are arranged diametrically opposite each other on the rotor. The bail is pivotable about a bail axis perpendicular to the axis of the rotor, between a folded-in line-winding position and a folded-out position, in which it is released of the line. One attachment forms a chamber, in which a compression spring is placed. The compression spring is connected to a pivot pin on the mounting element associated with this one attachment in order to press this mounting element towards a first and a second rotational position corresponding, respectively, to the line-winding position and the folded-out position of the bail when the pivot pin is located on one and the other side, respectively, of an over-center point.

3 Claims, 3 Drawing Sheets

FIG_1 PRIOR ART

BAIL MECHANISM IN AN OPEN-FACE FISHING REEL OF THE FIXED-SPOOL TYPE

BACKGROUND OF THE INVENTION

The present invention relates to a bail mechanism in an open-face fishing reel of the fixed-spool type.

Prior-art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle, and hence the line spool, in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool. During line retrieve, the line is thus wound onto the line spool which, as opposed to the rotor, does not rotate, but instead executes an axial oscillatory movement. In this manner, the line is distributed over the line spool.

A known bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between an operative folded-in position, in which it extends substantially at right angles to the spindle, and an inoperative folded-out position, in which it is located on the opposite side of the spindle and makes an angle therewith which is of the order of 45°. The bail is retained in its two positions by a torque spring mounted in one attachment under a cover fixed thereto. The torque spring has two projections, one of which engages in a hole in the attachment and the other of which engages in a hole in the corresponding mounting element.

This known bail mechanism suffers from the drawback that the torque spring is subjected to so considerable stresses as to be fatigued in a short time and liable to break and, therefore, must be exchanged at fairly short intervals. Also, replacing the torque spring is quite a troublesome operation since, among other things, the two projections of the spring must be fitted into the holes in the attachment and the mounting element.

In another known bail mechanism (U. S. Pat. No. 4,941, 626), the torque spring has been replaced by a tension spring having higher, yet not completely satisfactory strength.

SUMMARY OF THE INVENTION

The object of the present invention is to overcome this drawback and provide a bail mechanism which is so designed that the torque spring and the tension spring can be replaced by a compression spring of higher strength, and that assembly and exchange of the different components is easily done.

According to the invention, this object is achieved by means of a bail mechanism in an open-face fishing reel of the fixed-spool type having a housing, a rotor mounted on said housing, and a line spool coaxial with said rotor and adapted to oscillate in the axial direction, said bail mechanism comprising a bail for winding a line onto said line spool;

two attachments arranged on said rotor substantially diametrically opposite each other; and two mounting elements carrying said bail and being so rotatably mounted on a respective attachment that the bail is pivotable about a bail axis substantially perpendicular to the axis of said rotor, between a folded-in line-winding position and a folded-out position, in which the bail is released of the line;

one of said attachments being so designed as to form a chamber;

resilient means, disposed in said chamber, being arranged between a first point on said one attachment and a second point rotatable with the corresponding mounting element so as to act on this mounting element by spring force towards a first and a second rotational position corresponding, respectively, to the line-winding position of the bail and the folded-out position thereof, when said second point is located on one and the other side, respectively, of an over-center point;

said resilient means comprising a compression spring and a link arm which is articulated at one end to the compression spring and articulated at its other end to the mounting element corresponding to said one attachment, in said second point; and operating means being provided in said chamber in order, when the bail is in its folded-out position, to cooperate during the rotation of the rotor with cam means provided on the housing so as to rotate the mounting element corresponding to said one attachment from its second rotational position, in such a manner that said second point passes said over-center point.

Preferably, the link arm is articulated to the compression spring via a slide member. The compression spring and the slide member are suitably arranged in a guide groove in the chamber, in which the slide member is displaceable so as to compress the compression spring upon rotation of the mounting element corresponding to said one attachment towards its second rotational position.

Preferably, the operating means comprises a rod reciprocable in said chamber and adapted to be displaced by the mounting element corresponding to said one attachment upon its rotation to its second rotational position, to a rear position in which said rod, upon rotation of the rotor, comes into engagement with said cam means so as to be displaced towards a front position, thereby rotating the mounting element from its second rotational-position towards its first rotational position. Suitably, the rod is reciprocably mounted in a guide groove in said chamber.

In a preferred embodiment, the guide groove of the compression spring and of the slide member and the guide groove of the rod are formed in an insert element which is inserted in said chamber and which, together with the parts disposed in the respective guide grooves, can be removed from said chamber as a unit.

BRIEF DESCRIPTION OF THE DRAWINGS

The invention will now be described in more detail with reference to the accompanying drawings, in which.

DESCRIPTION OF THE PREFERRED EMBODIMENT

Figure 1:
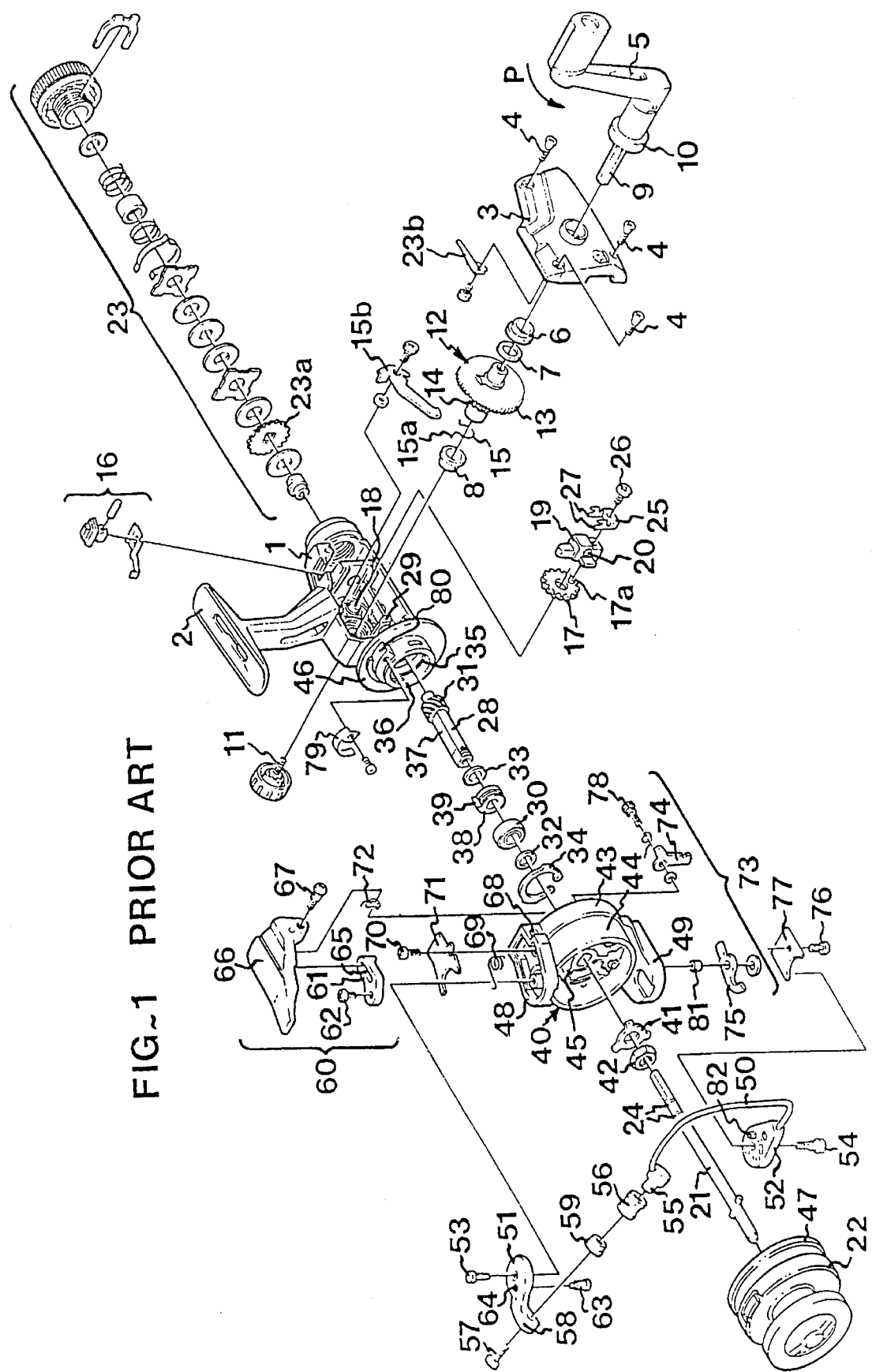
FIG. 1 is an exploded view showing a prior-art open-face fishing reel of the fixed-spool type provided with the known bail mechanism briefly described above.

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non-rotatably carries a gear unit 12. The gear unit 12 comprises a large driving gear 13 with axially directed teeth on its side facing away from the cover 3, and a small driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed to the housing 1 so as to form what is known as a silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the small driving gear 14 and has an axially directed eccentric pin 17a engaging in a vertical groove (not shown) in a driver element 19. The driver element 19 has a through bore 20, through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24, between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21, which is however rotatable relative the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball beating 30 in the end wall of the housing 1 opposite the brake mechanism 23. On its inner end, the rotor shaft 28 carries a gear 31 non-rotatably connected thereto and meshing with the large driving gear 13. The ball bearing 30 is surrounded by two spacer washers 32 and 33 and held in place by a locking washer 34 engaging in an inner groove 35 in a sleeve 36 axially projecting from said end wall of the housing 1. The rotor shaft 28 has two diametrically opposed planar surfaces 37, forming a flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by means of a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54, forming a pivot shaft for the bail at fight angles to the spindle 2 1. The bail 50 is pivotable between an operative folded-in position, which is shown in FIG. 1 and in which it extends substantially at right angles to the spindle 21, and an inoperative folded-out position, in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 which extends through an arm 58 on the mounting element 51 and through a spacer sleeve 59 and is screwed in the bearing pin 55.

When mining the handle 5 in the direction of line retrieve P, i.e. in the direction in which a fishing line (not shown) fixed to the line spool 22 is wound onto the line spool, the large driving gear 13 drives the gear 31, such that the rotor 40, and thus the bail 50, is rotated. At the same time, the small driving gear 14 drives the oscillating gear 17, such that the driver element 19, by the engagement of the eccentric pin 17a in the vertical groove therein, is moved back and forth so as to oscillate the spindle 21, and hence the line spool 22, in the longitudinal direction of the spindle. The spindle 21 and the line spool 22 are however not rotated during line retrieve. The fishing line then passes over the line roller 56 on the folded-in bail 50 so as to rotate the line roller, and is wound onto the line spool 22 during the rotation of the bail. Since the line spool 22 is oscillated during the line-winding operation, the line is distributed axially over the line spool.

Before a cast is to be made, the bail 50 is pivoted to the folded-out position so as to release the line from the line roller 56. During the cast, the line is paid out from the line spool 22 which, like the rotor 40, remains stationary during the cast. When line retrieve is again to be effected after the cast, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61, one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66 is pivoted, for example by the index finger, a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is mined in the direction opposite to the direction of line retrieve P, the rotor shaft 28, and hence the ring 38 non-rotatably mounted thereon, being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is the position shown in FIG. 1.

The above-mentioned automatic return of the bail 50 to its folded-in position as soon as line retrieve is commenced after a east, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79 on the fixed sleeve 36. The lever 75 is rotatable about a pin 81 parallel to the screw 54, about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74, which in turn acts on the lever 75 in such a direction that, by cooperating with the projection 82, it will pivot the bail 50 to its folded-in position.

In the known fishing reel described above, the ball mechanism suffers from the drawback, indicated in the introductory part, of using a torque spring 69. Moreover, the return mechanism 73 is rather complicated by including several different components.

A bail mechanism according to the present invention will now be described in more detail with reference to FIGS. 2–5.

The ball mechanism according to FIGS. 2–5 is intended for use in a fishing reel of the type described with reference to FIG. 1. The components of the fishing reel which are not shown in FIGS. 2–4 and not described in more detail with reference to these Figures are essentially similar to the corresponding components in the fishing reel of FIG. 1. It should however be pointed out that the fishing reel partly shown in FIGS. 2–4 has no trigger mechanism, i.e. the mechanism designated 60 in FIG. 1. It should also be noted that the ball mechanism according to the present invention can of course also be used in open-face fishing reels of the fixed-spool type of designs other than that shown in the drawings.

Like the ball mechanism described above, the ball mechanism according to the invention comprises a ball 50 for winding a line (not shown) on the line spool 22, two attachments 48 and 49 arranged on the rotor 40 diametrically opposite each other, and two mounting elements 51 and 52 carrying the bail 50 and rotatably connected to the attachments 48 and 49 by a respective pin 100 which replaces the screws 53 and 54 in the bail mechanism of FIG. 1 so as to form the pivot shaft of the bail 50.

Each pin 100 extends through a respective attachment 48, 49 and is retained thereon by a locking washer 101 engaging in a circumferential groove 102 at the free end of the pin 100 and is received in a recess 103 formed in a surface of the respective attachments 48, 49 which faces radially inwards with respect to the rotor 40.

In the bail mechanism of the invention, the attachment 48 has a circular, front portion 48a, which is coaxial with the pivot shaft of the bail 50. The front portion 48a forms a circular cavity 104 which is open radially outwards with respect to the rotor 40 of the fishing reel. Moreover, the attachment 48 has a tubular, rear portion 48b which extends in the axial direction of the rotor 40 and the hole 105 of which opens in the cavity 104 of the front portion 48a. The cavity 104 and the hole 105 together form a chamber in the attachment 48.

A center sleeve 106 is provided in the cavity 104 for supporting the mounting element 51, whose pin 100 extends through the sleeve 106. The pin 100 forms a center pin on a circular disk 107 forming part of the mounting element 51. The disk 107 has the same diameter as the front portion 48a of the attachment 48 and forms a rotatable cover closing the cavity 104.

A guide lug 108 is formed on the bottom of the cavity 104 adjacent the circumferential wall of the front portion 48a. A first stop lug 109 is formed on the circumferential wall immediately over the guide lug 108. A second stop lug 110 is formed on the circumferential wall on the same vertical level as the first stop lug 109 and at an angular distance therefrom of about 145°.

An insert element 111 of plastics material, which has the same shape as the hole 105 of the rear portion 48b, is inserted in this hole. The insert element 111 has integrally formed therewith a rear flange 112 and is fixed to the rear side of the attachment 48 by means of screws 113 which extend through holes 114 in the flange 112 and are screwed in the attachment 48.

The insert element 111 has a first longitudinal guide groove 115 of circular cross-section, which extends from the front end of the insert element 111 up to the flange 112. In its front portion, the guide groove 115 has forwardly-widening side recesses 116. The insert element 111 also has a second longitudinal guide groove 117 which extends from the front end of the insert element up to the flange 112. The guide groove 117 has particular cross-section, covering more than 180° of a circle, and forms a downwardly-open, longitudinal gap, whose width thus is smaller than the diameter of the circle.

A compression spring 118, having the same diameter as the guide groove 115 and being inserted therein, bears with its rear end on the flange 112. A circular-cylindrical slide member 119, having the same diameter as the guide groove 115 and being inserted therein, bears with its rear end on the compression spring 118. The slide member 119 is reciprocable in the guide groove 115 between a front position (FIG. 3) and a rear position (FIG. 4). In its front portion, the slide member 119 has a substantially semi-circular-cylindrical extension 120 with an upwardly directed pivot pin 121 formed thereon. A link arm 122 is pivotally connected to the slide member 119 by means of the pivot pin 121 and a hole 123 provided at the rear end of the link arm 122. Pivotal movement of the link arm 122 is enabled by the front side recesses 116 of the guide groove 115.

Figure 2:
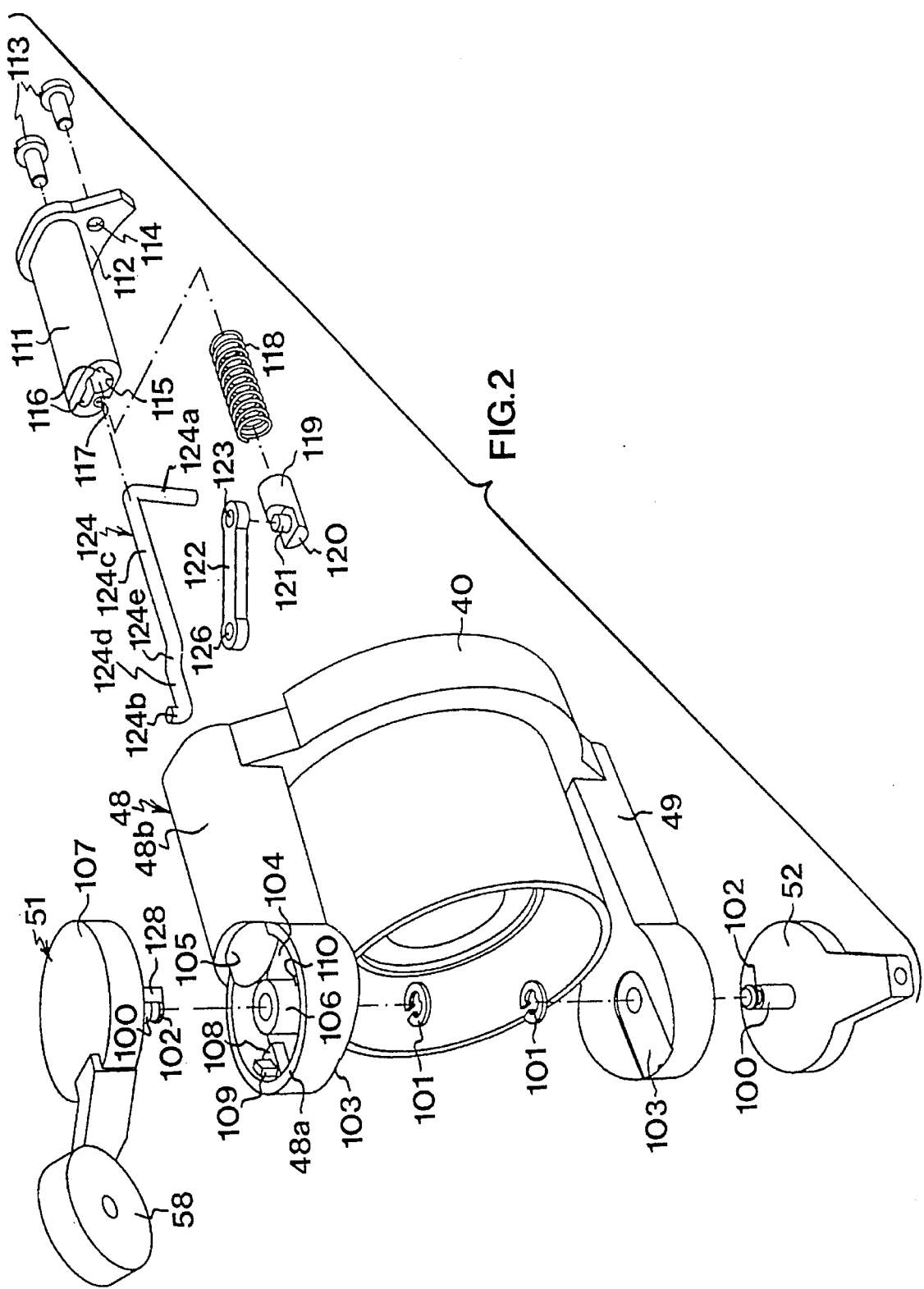
FIG. 2 is a partial exploded view showing parts of a bail mechanism according to the present invention, as well as parts of an open-face fishing reel of the fixed-spool type provided with this bail mechanism.

An operating member 124, made from a bent round-wire element having the same diameter as the guide groove 117, has a vertically downwardly-bent, rear end portion 124a and a vertically upwardly-bent, front end portion 124b. Moreover, the operating member 124 has a rear, horizontal, straight portion 124c having substantially the same length as the insert element 111, and a front, horizontal, straight portion 124d which is shorter than the portion 124c and extends parallel thereto. The two horizontal, straight portions 124c and 124d are slightly offset laterally in relation to each other and are interconnected by a connecting portion 124e. It should be noted that "upwardly" and "downwardly" as used herein relate to the rotational position of the rotor 40 which is shown in FIG. 2, while "front" and "rear" relate to the normal position of use of the fishing reel when mounted on a fishing rod.

The operating member 124, whose rear, horizontal, straight portion 124c is snapped into the guide groove 117 of the insert element 111, is movable back and forth therein between a front position (FIG. 3) and a rear position (FIG. 4). To enable this displacement, the rear portion 48b of the attachment 48 is provided at its underside with a recess (not shown), which accommodates the rear end portion 124a of the operating member 124. When the operating member 124 is in its rear position, its rear end portion 124a is in such a position that, when the rotor 40 is rotating in the line-winding direction, it encounters a cam curve 80 fixed on the housing of the fishing reel. During the displacement of the operating member 124, its front, horizontal, straight portion 124d is guided in a guide groove which is formed between the guide lug 108 and the center sleeve 106 (see FIGS. 3 and 4).

Figure 3:
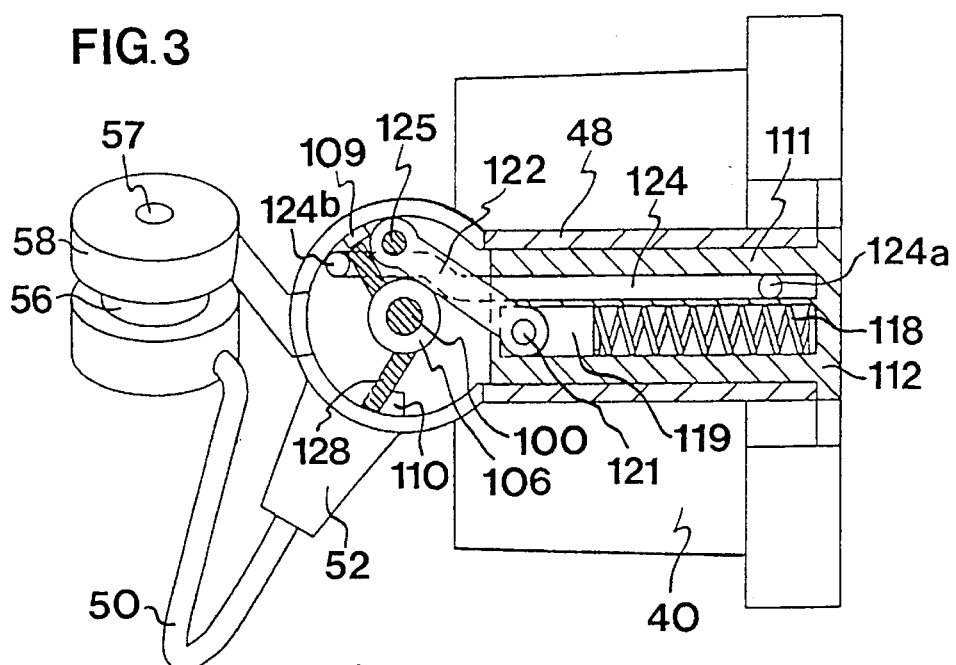
FIG. 3 is a sectional view showing the bail mechanism according to the invention in a position, in which its bail is in a folded-in position.
Figure 4:
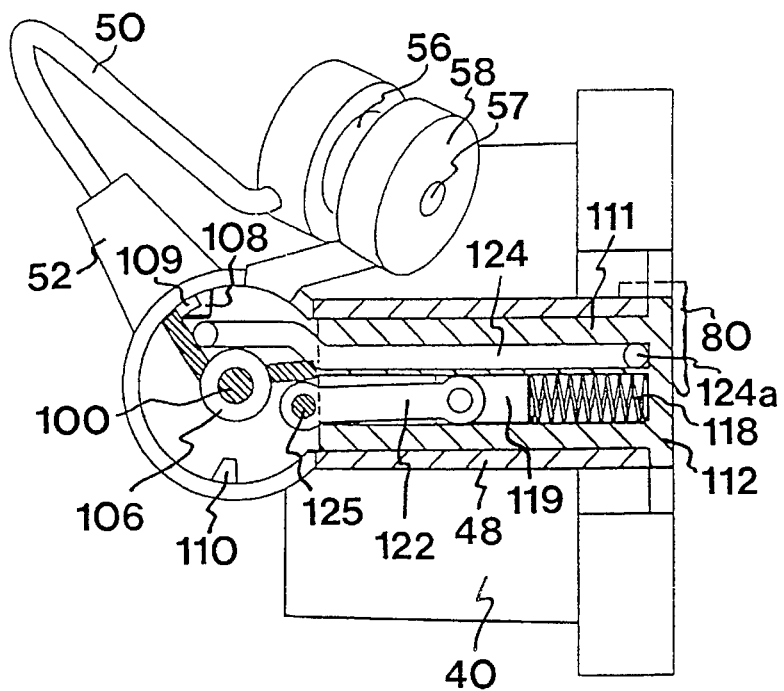
FIG. 4 is a sectional view showing the bail mechanism according to the invention in a position, in which its bail is in a folded-out position.
Figure 5:
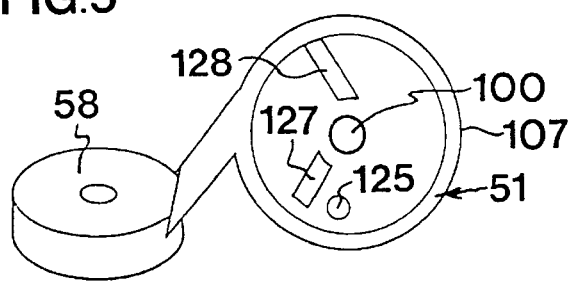
FIG. 5 shows a mounting element being part of the bail mechanism according to the invention.

At its underside, the disk 107 of the mounting element 51 has, in addition to the center pin 100, a peripheral, vertically downwardly-directed pivot pin 125 rotatably engaging in a hole 126 at the end of the link arm 122 opposite the hole 123 thereof, and two lugs 127 and 128 which are substantially radial with respect to the center pin 100 and spaced therefrom a distance substantially equal to the wall thickness of the center sleeve 106 (see FIGS. 3 and 4, in which the center pin 100, the pivot pin 125 and the lugs 127 and 128 of the disk 107 are hatched). The two lugs 127 and 128 have a different radial length. The lug 127 has such a length that, during rotation of the disk 107, it can pass the stop lug 109, whereas the lug 128 has such a length that it cannot pass this lug 109, nor the second stop lug 110.

When the bail 50 is in its folded-in line-winding position (FIG. 3), the disk 107 is in such a rotational position that its lug 128 engages the stop lug 110. The bail 50 is retained in its line-winding position by the compression spring 118 which, via the slide member 119, the pivot pin 121, the link arm 122 and the pivot pin 125, urges the disk 107 counterclockwise with respect to FIGS. 3 and 4, i.e. in such a direction that the lug 128 is pressed against the stop lug 110. In this rotational position of the disk 107, the lug 127 is almost opposite the stop lug 109 and engages the rear side of the vertically upwardly-bent, front end portion 124b of the operating member 124 so as to maintain the operating member 124 in its front position.

When the bail 50 is swung from its folded-in line-winding position (FIG. 3) to its folded-out position (FIG. 4), the disk 107 is rotated clockwise with respect to FIGS. 3 and 4, its pivot pin 125 urging the link arm 122, and hence the slide member 119, further into the guide groove 115 while compressing the compression spring 118. The clockwise rotation of the disk 107 is interrupted when the lug 128 comes into engagement with the stop lug 109. In this rotational position of the disk 107, the pivot pin 125 has passed the center line of the guide groove 115, entailing that the compression spring 118 now urges the disk 107 clockwise, i.e. in such a direction that the lug 128 is pressed against the stop lug 109. As a result, the bail 50 is retained in its folded-out position. During this clockwise rotation of the disk 107, the lug 128 comes into engagement with the vertically upwardly-bent, front end portion 124b of the operating member 124 and moves this to its rear position.

When the rotor 40 is rotated in the line-winding direction, the vertically downwardly-bent, rear end portion 124a of the operating member 124 will come into engagement with the cam curve 80 which is fixedly mounted on the housing of the fishing reel and which, against the action of the compression spring 118, then urges the operating member 124 a sufficient distance forwards in order that the operating member, by its front end portion 124b and the lug 128, should rotate the disk 107 counterclockwise such a distance that the pivot pin 125 passes the center line of the guide groove 115. When this has taken place, the compression spring 118 rotates the disk 107 counterclockwise until the lug 128 comes into engagement with the stop lug 110. During the final phase of this counterclockwise rotation of the disk 107, the lug 127 will come into engagement with the front end portion 124b of the operating member 124 and move this to its front position.

As will have been appreciated, the point where the pivot pin 125 passes the center line of the guide groove 115 constitutes an over-center point in that the action exerted by the compression spring 118 on the disk 107 switches from counterclockwise rotation to clockwise rotation and vice versa, when the pivot pin 125 passes this point clockwise and counterclockwise, respectively.

As will also have been understood, the insert element 111 with the parts mounted therein, i.e. the compression spring 118, the slide member 119, the link arm 122 and the operating member 124, can very easily be removed from and inserted in the chamber 104, 105 as a unit.

The return mechanism 73 consisting of several different components and used in the fishing reel described above with reference to FIG. 1 has been replaced by a single component, namely the operating member 124, which forms part of the bail mechanism according to the invention.

What I claim and desire to secure by Letters Patent is:

1. A bail mechanism in an open-face fishing reel of the fixed-spool type having a housing, a rotor mounted on said housing, and a line spool which is coaxial with said rotor and adapted to oscillate in the axial direction, said bail mechanism comprising:

a bail for winding a line onto said line spool;

two attachments arranged on said rotor substantially diametrically opposite each other; and two mounting elements carrying said bail and being so rotatably mounted on respective attachments that the bail is pivotable about a bail axis substantially perpendicular to the axis of the rotor, between a folded-in line-winding position and a folded-out position, in which the bail is released of the line;

one of said attachments having an internal chamber;

resilient means, disposed in said chamber, being arranged between a first point on said one of said attachments and a second point rotatable with the corresponding one of the mounting elements so as to act on mounting elements by spring force towards a first rotational position and a second rotational position corresponding, respectively, to the line-winding position of the bail and the folded-out position thereof when said second point is located on one and the other side, respectively, of an over-center point;

said resilient means comprising a compression spring, a slide member and a link arm which is articulated at a first end of the link arm to the compression spring via the slide member and articulated at a second end of the link arm to the mounting element corresponding to said one of said attachments, in said second point;

the compression spring and the slide member being arranged in a first guide groove in said chamber, in which the slide member is displaceable so as to compress the compression spring upon rotation of the mounting element corresponding to said one attachment towards the second rotational position of the mounting element;

operating means being provided in said chamber in order, when the bail is in its folded-out position, to cooperate during the rotation of the rotor with cam means for rotatinq the mountinq element provided on the housing so as to rotate the mounting element corresponding to said one attachment from the second rotational position of the mounting elements in such a manner that said second point passes said over-center point;

the operating means comprising a rod reciprocable in a second guide groove in said chamber and adapted to be displaced by the mounting element corresponding to said one attachment upon its rotation to its second rotational position, to a rear position in which said rod, upon rotation of the rotor, comes into engagement with said cam means so as to be displaced towards a front position, thereby rotating the mounting element from its second rotational position towards its first rotational position;

said first guide groove of the compression spring and of the slide member and said second guide groove of the rod being formed in an insert element which is inserted in said chamber; and said insert element, the compression spring disposed in the first guide groove, the slide member, and the rod disposed in the second guide grooves, being together removable from said chamber as a unit.

2. A bail mechanism in an open-face fishing reel of the fixed-spool type having a-housing, a rotor mounted on said housing, and a line spool which is coaxial with said rotor and adapted to oscillate in the axial direction, said bail mechanism comprising a bail for winding a line onto said line spool;

two attachments arranged on said rotor substantially diametrically opposite each other; and two mounting elements carrying said bail and being so rotatably mounted on respective attachments that the bail is pivotable about a bail axis substantially perpendicular to the axis of the rotor, between a folded-in line-winding position and a folded-out position, in which the bail is released of the line;

one of said attachments having an internal chamber;

resilient means, disposed in said chamber, being arranged between a first point on said one of said attachments and a second point rotatable with the corresponding one of the mounting elements so as to act on the one of the mounting elements by spring force towards a first rotational position and a second rotational position corresponding, respectively, to the line-winding position of the bail and the folded-out position thereof when said second point is located on one and the other side, respectively, of an over-center point;

said resilient means comprising a compression spring, a slide member and a link arm which is articulated at a first end of the link arm to the compression spring via the slide member and articulated at a second end of the link arm to the mounting element corresponding to said one of said attachments, in said second point;

operating means being provided in said chamber in order, when the bail is in its folded-out position, to cooperate during the rotation of the rotor with cam means for rotating the mounting element provided on the housing so as to rotate the mounting element corresponding to said one attachment from the second rotational position of the mounting element, in such a manner that said second point passes said over-center point;

the compression spring and the slide member being arranged in a first guide groove in said chamber, in which the slide member is displaceable so as to compress the compression spring upon rotation of the mounting element corresponding to said one attachment towards the second rotational position of the mounting element;

said first guide groove of the compression spring and of the slide member and a second guide groove of a rod being formed in an insert element which is inserted in said chamber; and said insert element, the compression spring disposed in the first guide groove, the slide member, and the rod disposed in the second guide grooves, being together removable from said chamber as a unit.

3. A bail mechanism in an open-face fishing reel of the fixed-spool type having a housing, a rotor mounted on said housing, and a line spool which is coaxial with said rotor and adapted to oscillate in the axial direction, said bail mechanism comprising a bail for winding a line onto said line spool;

two attachments arranged on said rotor substantially diametrically opposite each other; and two mounting elements carrying said bail and being so rotatably mounted on respective attachments that the bail is pivotable about a bail axis substantially perpendicular to the axis of the rotor, between a folded-in line-winding position and a folded-out position, in which the bail is released of the line;

one of said attachments having an internal chamber;

resilient means, disposed in said chamber, being arranged between a first point on said one of said attachments and a second point rotatable with the corresponding one of the mounting elements so as to act on the one of the mounting elements by spring force towards a first rotational position and a second rotational position corresponding, respectively, to the line-winding position of the bail and the folded-out position thereof when said second point is located on one and the other side, respectively, of an over-center point;

said resilient means comprising a compression spring and a link arm which is articulated at a first end of the link arm to the compression spring and articulated at a second end of the link arm to the mounting element corresponding to said one of said attachments, in said second point;

operating means being provided in said chamber in order, when the bail is in its folded-out position, to cooperate during the rotation of the rotor with cam means for rotating the mounting element provided on the housing so as to rotate the mounting element corresponding to said one attachment from the second rotational position of the mounting element, in such a manner that said second point passes said over-center point;

the operating means comprising a rod reciprocable in a second guide groove in said chamber and adapted to be displaced by the mounting element corresponding to said one attachment upon its rotation to its second rotational position, to a rear position in which said rod, upon rotation of the rotor, comes into engagement with said cam means so as to be displaced towards a front position, thereby rotating the mounting element from its second rotational position towards its first rotational position;

the compression spring and a slide member arranged in a first guide groove in said chamber, in which the slide member is displaceable so as to compress the compression spring upon rotation of the mounting element corresponding to said one attachment towards the second rotational position of the mounting element;

said first guide groove of the compression spring and of the slide member and said second guide groove of the rod being formed in an insert element which is inserted in said chamber; and said insert element, the compression spring disposed in a first guide groove, the slide member, and the rod disposed in the second guide grooves, being together removable from said chamber as a unit.

* * * * *